United States Patent
Zheng et al.

(10) Patent No.: US 6,983,793 B2
(45) Date of Patent: *Jan. 10, 2006

(54) DUAL EVAPORATOR AIR CONDITIONING SYSTEM AND METHOD OF USE

(75) Inventors: Jing Zheng, Williamsville, NY (US); Prasad Shripad Kadle, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 234 days.

This patent is subject to a terminal disclaimer.

(21) Appl. No.: 10/299,566

(22) Filed: Nov. 19, 2002

(65) Prior Publication Data

US 2004/0094294 A1    May 20, 2004

(51) Int. Cl.
  *F25B 29/00*   (2006.01)
  *B60H 1/00*    (2006.01)
  *B60H 3/00*    (2006.01)
  *B60H 1/32*    (2006.01)

(52) U.S. Cl. .......................... 165/203; 165/42; 165/43; 62/199; 62/513; 62/193; 62/200; 62/192

(58) Field of Classification Search ................. 165/203, 165/42, 43; 62/192, 193, 199, 200, 513
See application file for complete search history.

(56) References Cited

U.S. PATENT DOCUMENTS

| | | | |
|---|---|---|---|
| 4,483,151 A | 11/1984 | Fujioka et al. ................. | 62/157 |
| 4,949,779 A | 8/1990 | Kenny et al. ................... | 165/2 |
| 5,105,096 A | 4/1992 | Waldschmidt et al. ........ | 307/68 |
| 5,142,881 A * | 9/1992 | Nagayama .................. | 62/228.5 |
| 5,333,678 A | 8/1994 | Mellum et al. ............... | 165/42 |
| 5,582,236 A | 12/1996 | Eike et al. ..................... | 165/43 |
| 6,516,486 B1 | 2/2003 | Mehendale et al. | |
| 6,655,163 B1 | 12/2003 | Scherer et al. | |
| 6,758,054 B2 * | 7/2004 | Zheng et al. ................. | 62/199 |

FOREIGN PATENT DOCUMENTS

| | | | |
|---|---|---|---|
| DE | 4212703 | | 6/1953 |
| EP | 0881108 | | 2/1998 |
| EP | 0842798 | | 5/1998 |
| EP | 0888912 | | 7/1999 |
| JP | 59149813 A | * | 8/1984 |
| JP | 03031679 A | * | 2/1991 |
| JP | 07218011 A | * | 8/1995 |

* cited by examiner

*Primary Examiner*—John K. Ford
(74) *Attorney, Agent, or Firm*—Patrick M. Griffin

(57) ABSTRACT

A dual evaporator air conditioning system and method for use therewith to cool air in front and rear portions of a cabin of a vehicle. The dual evaporator air conditioning system includes primary and auxiliary HVAC units to cool the air in the front and rear portions of the cabin, respectively. The dual evaporator air conditioning system also includes a control system having cooling and non-cooling modes for each of the HVAC units. The control system automatically activates a heating element near the auxiliary evaporator in response to the auxiliary HVAC unit being in the non-cooling mode while the primary HVAC unit is in the cooling mode. The heating element heats the refrigerant in the auxiliary evaporator to prevent accumulation of liquid refrigerant and lubricating oil in the auxiliary evaporator when the auxiliary HVAC unit is in the non-cooling mode while the primary HVAC unit is in the cooling mode.

26 Claims, 3 Drawing Sheets

DUAL EVAPORATOR AIR CONDITIONING SYSTEM AND METHOD OF USE

FIELD OF THE INVENTION

The present invention relates to a dual evaporator air conditioning system for cooling air in a cabin of a vehicle and a method of cooling the air using the dual evaporator air conditioning system. More specifically, the present invention relates to the dual evaporator air conditioning system having primary and auxiliary HVAC units to cool the air in the front and rear portions of the cabin and the method of cooling the air in the front and rear portions of the cabin using the dual evaporator air conditioning system.

BACKGROUND OF THE INVENTION

Dual evaporator air conditioning systems are well known in the art for cooling air in front and rear portions of a cabin of a vehicle. A typical dual evaporator air conditioning system includes a primary HVAC unit to cool the front portion of the cabin and an auxiliary HVAC unit to cool the rear portion of the cabin. The primary HVAC unit includes a primary evaporator and the auxiliary HVAC unit includes an auxiliary evaporator. The primary and auxiliary evaporators are fluidly connected to a common compressor and common condenser. The compressor compresses and circulates refrigerant to the condenser. The condenser cools and condenses the refrigerant, which is then circulated to both the primary and auxiliary evaporators.

The primary evaporator is held by a primary housing and is used to transfer heat from the air to the refrigerant. A primary blower moves the air across the primary evaporator, and a plurality of primary air ducts direct the air into the front portion of the cabin. The auxiliary evaporator is held by an auxiliary housing and is used to transfer heat from the air to the refrigerant. An auxiliary blower moves the air across the evaporator, and a plurality of auxiliary air ducts direct the air into the rear portion of the cabin.

Examples of dual evaporator air conditioning systems are shown in U.S. Pat. No. 4,949,779 to Kenny et al. (the '779 patent) and U.S. Pat. No. 5,142,881 to Nagayama (the '881 patent). The dual evaporator air conditioning systems of the '779 and the '881 patents include primary and auxiliary evaporators connected to a common compressor to cool front and rear portions of a vehicle cabin.

Dual evaporator air conditioning systems of the prior art utilize a control system to control operation of the compressor and the primary and auxiliary HVAC units to cool the front and rear portions of the cabin. Generally, the control system activates the compressor when the primary HVAC unit is in a cooling mode, i.e., a user has requested cooled air for the front portion of the cabin. The auxiliary HVAC unit can also be in a cooling mode, i.e., the user has requested cooled air for the rear portion of the cabin. Alternatively, the auxiliary HVAC unit can remain in a non-cooling mode while the primary HVAC unit is in the cooling mode, i.e., the user has requested cooled air for the front portion, but not for the rear portion. In this instance, the compressor continues to circulate refrigerant through the auxiliary evaporator of the auxiliary HVAC unit even though the auxiliary HVAC unit is in the non-cooling mode. In such a case, liquid refrigerant and lubricating oil begin to accumulate in the auxiliary evaporator.

The liquid refrigerant and lubricating oil become stored or trapped in the auxiliary evaporator because the auxiliary evaporator is not transferring heat from the air in the rear portion of the cabin to the refrigerant in the auxiliary evaporator. As a result, the refrigerant is not converted to a vapor and the viscosity of the refrigerant in the auxiliary evaporator increases. As the viscosity of the refrigerant increases, more and more lubricating oil becomes trapped in the refrigerant to remain in the auxiliary evaporator. Accumulation of the liquid refrigerant and lubricating oil in the auxiliary evaporator results in refrigerant starvation to the rest of the system and poor compressor lubrication.

When liquid refrigerant is stored in the auxiliary evaporator, refrigerant for the rest of the dual evaporator air conditioning system is reduced. If the amount of liquid refrigerant that is stored is greater than a reserve charge, the primary evaporator will operate at a sub-critical charge. Furthermore, when lubricating oil is trapped in the auxiliary evaporator, the compressor does not receive adequate lubrication resulting in wear and tear of the compressor's internal components. Prior art dual evaporator air conditioning systems attempt to alleviate the buildup of the liquid refrigerant and lubricating oil in the auxiliary evaporator by adding a valve upstream of the auxiliary evaporator. The valve is closed when the auxiliary HVAC unit is in the non-cooling mode and open when the auxiliary HVAC unit is in the cooling mode. Such valves are relatively expensive, and require considerable attention and maintenance to ensure proper operation. As a result, there is a need in the art for an improved, economically feasible system to minimize refrigerant collection in the auxiliary evaporator.

SUMMARY OF THE INVENTION AND ADVANTAGES

The present invention provides a dual evaporator air conditioning system for use with a refrigerant for cooling air. The dual evaporator air conditioning system includes a compressor to compress and circulate the refrigerant through a primary air conditioning unit and an auxiliary air conditioning unit. The primary air conditioning unit includes a primary evaporator to transfer heat from the air to the refrigerant to cool the air. The auxiliary air conditioning unit includes an auxiliary evaporator to transfer heat from the air to the refrigerant to cool the air. A heater is near the auxiliary evaporator to heat the refrigerant and prevent accumulation of liquid refrigerant and lubricating oil in the auxiliary evaporator.

A method of cooling the air is also provided. The method uses the dual evaporator air conditioning system to cool the air. To start, each of the primary and auxiliary air conditioning units are switched from the non-cooling mode to the cooling mode. The compressor is then activated in response to the primary air conditioning unit being switched from the non-cooling mode to the cooling mode. Refrigerant circulates through the primary evaporator and the auxiliary evaporator in response to activating the compressor. Primary and auxiliary blowers are then activated to transfer heat from the air to the refrigerant to cool the air. The blowers are activated in response to the primary and auxiliary air conditioning units being in the cooling mode. The cooled air is discharged from the primary and auxiliary air conditioning units in response to activating the blowers. Next, the auxiliary air conditioning unit is switched from the cooling mode to the non-cooling mode while the primary air conditioning unit remains in the cooling mode. As a result, the heater near the auxiliary evaporator is automatically activated in response to the auxiliary air conditioning unit being switched from the cooling mode to the non-cooling mode while the primary air conditioning unit remains in the cooling mode.

The present invention provides several advantages over the prior art. In particular, the heater of the present invention is automatically activated in response to the auxiliary air conditioning unit being in the non-cooling mode while the primary air conditioning unit is in the cooling mode. As a result, the heater transfers heat to the refrigerant even though the auxiliary air conditioning unit is in the non-cooling mode. With a continuous transfer of heat from the heater, the refrigerant in the auxiliary evaporator will be converted to vapor that easily moves through the auxiliary evaporator without being trapped therein. The result is a reduction in the amount of liquid refrigerant and lubricating oil stored or trapped in the auxiliary evaporator.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
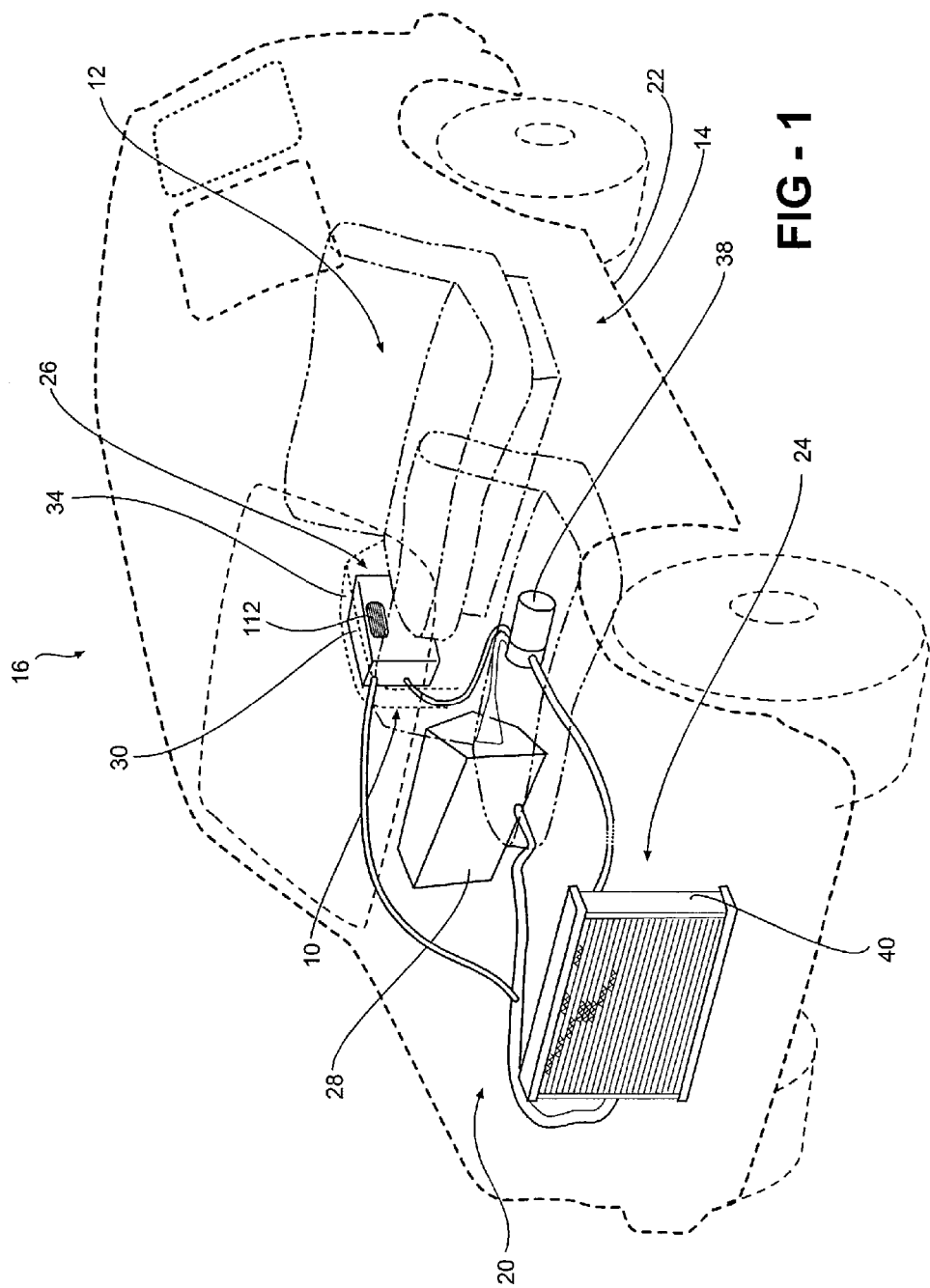
FIG. 1 is a perspective view of a vehicle having a dual evaporator air conditioning system of the present invention.

Referring to the Figures, wherein like numerals indicate like or corresponding parts throughout the several views, a dual evaporator air conditioning system for use with a refrigerant to cool air in front and rear portions 10,12 of a cabin 14 of a vehicle 16 is shown generally at 20. The dual evaporator air conditioning system 20 is positioned in a vehicle body 22 of the vehicle 16. The vehicle body 22 defines the front and rear portions 10,12 of the cabin 14 of the vehicle 16.

The dual evaporator air conditioning system 20 works to cool the air in the front and rear portions 10,12 of the cabin 14 by circulating the refrigerant in a refrigerant cycle to absorb heat from the air. The dual evaporator air conditioning system 20 comprises a primary HVAC unit 28 and an auxiliary HVAC unit 30, shown in cross-section in FIG. 2. The primary HVAC unit 28 is preferably positioned in the vehicle 16 near the front portion 10 of the cabin 14. The primary HVAC unit 28 includes a primary evaporator 32 in the refrigerant cycle to cool the air in the front portion 10 of the cabin 14. Referring to FIG. 1, the primary HVAC unit is disposed in the vehicle body 22 of the vehicle 16 near an engine compartment 24.

The auxiliary HVAC unit 30 is preferably positioned in the vehicle 16 near the rear portion 12 of the cabin 14. Referring to FIG. 1, the auxiliary HVAC unit 30 is disposed in a chamber 26 defined by the vehicle body 22. The chamber 26 is separate from the front and rear portions 10,12 of the cabin 14. In particular, the chamber 26 is partitioned from the rear portion 12 of the cabin 14 by interior molding 34. Preferably, the interior molding 34 is an inner side panel in the rear portion 12 with the chamber 26 being set back and partially sealed behind the side panel. The shape of the chamber 26 is similar to the auxiliary HVAC unit 28 to reduce size requirements. The auxiliary HVAC unit 30 includes an auxiliary evaporator 36 in the refrigerant cycle to cool the air in the rear portion 12 of the cabin 14.

Figure 2:
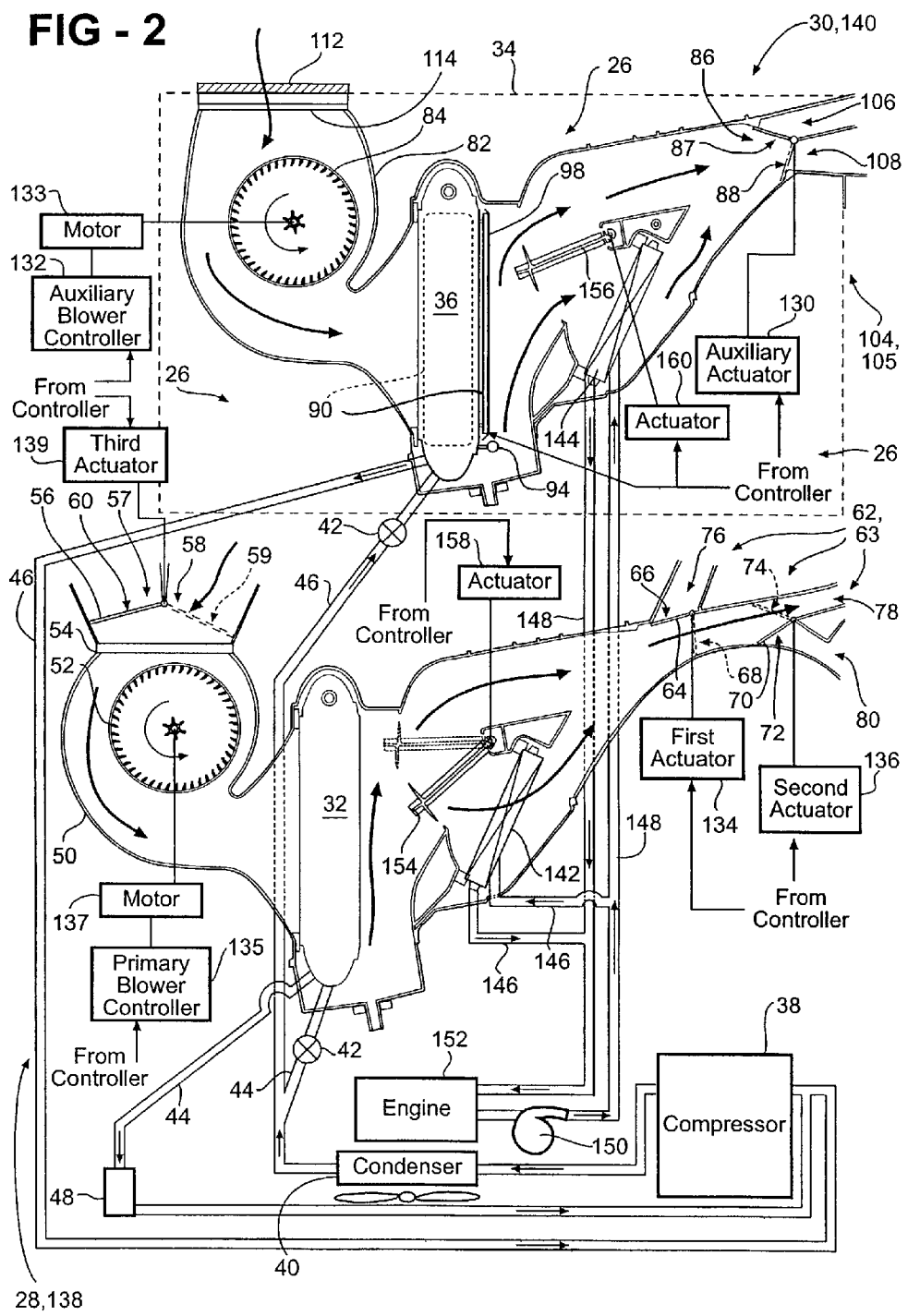
FIG. 2 is a cross-sectional and partially schematic view of the dual evaporator air conditioning system of the present invention.

Referring specifically to FIGS. 1 and 2, a compressor 38 is in fluid communication with both the primary and auxiliary evaporators 32,36. The compressor 38 is disposed within the vehicle body 22 of the vehicle 16 to compress and circulate the refrigerant in the refrigerant cycle. The type of refrigerant used with the dual evaporator air conditioning system 20 of the present invention is preferably one that exhibits efficient heat transfer rates while being environmentally friendly. The refrigerant used with the dual evaporator air conditioning system 20, however, is not intended to limit the present invention.

A condenser 40 is disposed within the vehicle body 22 and in the refrigerant cycle to receive the compressed refrigerant from the compressor 38. The refrigerant entering the condenser 40 from the compressor 38 is generally in the form of a gas. The condenser 40 then cools and condenses the refrigerant. The refrigerant exits the condenser 40 as a high-pressure liquid and travels to an expansion device 42 upstream of each of the primary and auxiliary HVAC units 28,30.

The expansion device 42 expands the refrigerant from the condenser 40 to provide the primary and auxiliary evaporators 32,36 with a low quality vapor. It should be appreciated by those skilled in the art, that the compressor 38 and condenser 40 are common to both units, i.e., one compressor 38 and one condenser 40 are used in the refrigerant cycle.

The refrigerant is circulated in primary and auxiliary parallel loops 44,46 of the refrigerant cycle to the primary and auxiliary evaporators 32,36 of the HVAC units 28,30, respectively. The primary and auxiliary parallel loops 44,46 are interconnected such that the refrigerant from the condenser 40 moves through both of the loops 44,46 to the primary and auxiliary evaporators 32,36. The refrigerant is converted from a low quality vapor to a high quality vapor or gas in the primary and auxiliary evaporators 32,36. From the auxiliary evaporator 36, the gas refrigerant travels back to the compressor 38 to begin the cycle again. From the primary evaporator 32, the refrigerant travels first to an accumulator-dehydrator canister 48 to separate any liquid refrigerant from the vapor refrigerant and then back to the compressor 38 to begin the cycle again.

It should be appreciated that the refrigerant cycle is generally illustrated and is not intended to limit the present invention. For example, the dual evaporator air conditioning system 20 may be configured without the accumulator-dehydrator canister, but with a receiver when a thermal expansion valve is employed.

The primary evaporator 32 is a heat exchanger that transfers heat from the air in the front portion 10 of the cabin 14 to the refrigerant that is circulating through the primary parallel loop 44. The primary evaporator 32 cools the air for the front portion 10 of the cabin 14. A primary housing 50 surrounds the primary evaporator 32. As previously described, the refrigerant enters the primary evaporator 32 as a low quality vapor and exits as a high quality vapor or gas. A primary blower 52 is disposed in the primary housing 50 and engages the primary housing 50 to move the air from the front portion 10 of the cabin 14 across the primary evaporator 32 to transfer the heat from the air to the refrigerant. This movement of air is illustrated using arrows in FIG. 2.

Alternatively, the primary blower 52 may receive air from outside the vehicle 16 that is first filtered through an intake filter 54 to be moved across the primary evaporator 32. It will be appreciated by those skilled in the art that the intake filter 54 is not necessary to draw outside air into the primary HVAC unit 28. Either outside air or the air from the front portion 10 of the cabin 14 can be cooled in the primary HVAC unit 28. Referring to FIG. 2, an intake door 56 can be used to switch between outside air and air from within the cabin 14. An outside air duct 58 and a return duct 60 are used to direct the air into the primary HVAC unit 28. The intake door 56 alternates between two positions 57,59 to switch between drawing outside air and drawing air from the cabin 14 into the primary housing 50. Regardless of the air source, the liquid refrigerant in the primary evaporator 32 begins to boil due to the heat in the air moving across the primary evaporator 32 (the refrigerant typically has a low boiling point). The refrigerant, therefore, changes phases, i.e., from the liquid refrigerant to the vapor refrigerant phase and absorbs heat from the air.

A plurality of primary air duct housings 63 extend from and engage the primary housing 50 to define a plurality of primary air ducts 62 to distribute the air from the primary HVAC unit 28 into the front portion 10 of the cabin 14. The plurality of primary air ducts 63 is downstream of the primary evaporator 32, i.e., the air is cooled before reaching the primary air ducts 62. A first mode door 64 that is downstream of the primary evaporator 32 engages the primary housing 50 and is movable between first and second positions 66,68 to selectively distribute the air into the primary air ducts 62 to be distributed into the front portion 10 of the cabin 14. Preferably, the first mode door 64 pivots relative to the primary housing 50 to change the positions 66,68. A second mode door 70 engages the primary housing 50 and is movable between first and second positions 72,74 to selectively distribute the air into the primary air ducts 62 to be distributed into the front portion 10 of the cabin 14. Preferably, the second mode door 70 pivots relative to the primary housing 50 to change the positions 72,74.

The plurality of primary air ducts 62 include a primary defrost duct 76, a primary vent duct 78, and a primary floor duct 80. The first mode door 64 is upstream of the second mode door 70 and diverts cooled air to the primary defrost duct 76 in the second position 68 and closes the primary defrost duct 76 in the first position 66. The second mode door 70 diverts cooled air to the primary vent duct 78 in the first position 72 and to the primary floor duct 80 in the second position 74 (when the first mode door 64 is in the first position 66). It should be appreciated that the number of mode doors 64,70, or primary air ducts 62 used to divert the cooled air from the primary HVAC unit 28 is not intended to limit the present invention. It should be appreciated by those skilled in the art, that many different configurations could be utilized.

The auxiliary evaporator 36 is a heat exchanger that transfers heat from the air in the rear portion 12 of the cabin 14 to the refrigerant circulating through the auxiliary parallel loop 46. The auxiliary evaporator 36 cools the air for the rear portion 12 of the cabin 14. An auxiliary housing 82 surrounds the auxiliary evaporator 36. As previously described, the refrigerant enters the auxiliary evaporator 36 as a low quality vapor and exits as a high quality vapor. An auxiliary blower 84 is disposed in the auxiliary housing 82 and engages the auxiliary housing 82 to move the air from the rear portion 12 of the cabin 14 across the auxiliary evaporator 36 to transfer the heat from the air to the refrigerant. As a result, any liquid refrigerant in the auxiliary evaporator 36 begins to boil. The refrigerant, therefore, changes phases, i.e., from the liquid refrigerant to the vapor refrigerant phase thereby absorbing heat from the air.

An air intake vent 112, near the auxiliary housing 82, engages the interior molding 34 and operatively communicates with the rear portion 12 of the cabin 14. The air intake vent 112 guides the air from the rear portion 12 into the auxiliary housing 82 upstream of the auxiliary blower 84. An air filter 114 may be disposed between the air intake vent 112 and the auxiliary housing 82 to remove particles from the air.

A plurality of auxiliary air duct housings 105 extend from and engage the auxiliary housing 82 to define a plurality of auxiliary air ducts 104 to distribute the cooled air into the rear portion 12 of the cabin 14. In the preferred embodiment, the plurality of auxiliary air ducts 104 include an auxiliary vent duct 106 and an auxiliary floor duct 108 communicating with the auxiliary housing 82 to distribute the air from the auxiliary HVAC unit 30 into the rear portion 12 of the cabin 14. An auxiliary mode door 86 engages the auxiliary housing 82 and is movable between first and second positions 87,88 to direct the cooled air into the rear portion 12 of the cabin 14. The first and second positions 87,88 correspond to vent and heater modes of the auxiliary HVAC unit 30. The first position 87 corresponds to discharging the cooled air through the auxiliary vent duct 106 and the second position 88 corresponds to discharging the cooled air through the auxiliary floor duct 108.

Figure 3:
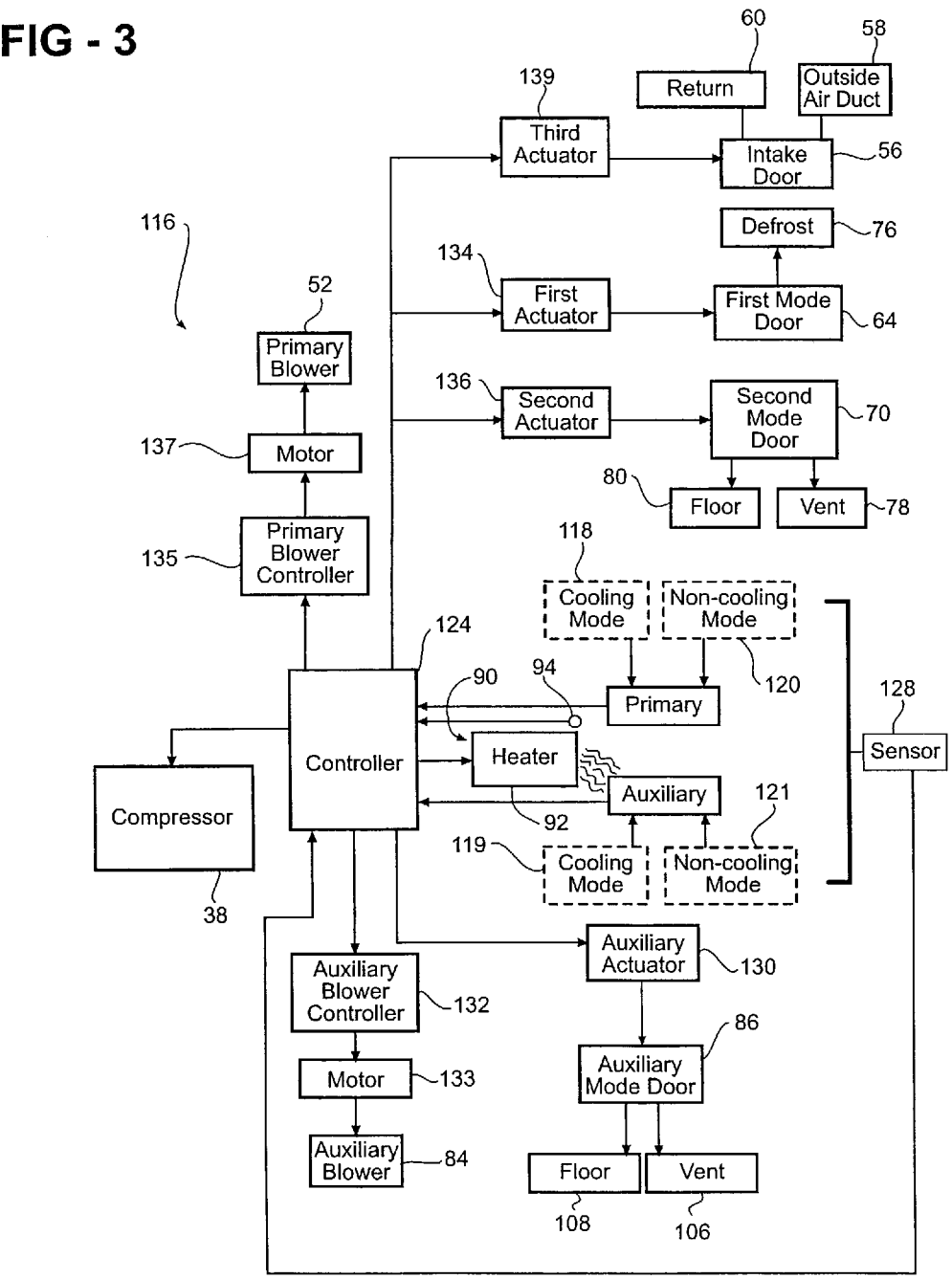
FIG. 3 is a block diagram illustrating a control system of the dual evaporator air conditioning system.

Referring to FIGS. 2 & 3, a heater 90 is mounted to the auxiliary evaporator 36 to heat the refrigerant inside the auxiliary evaporator 36. Alternatively, the heater 90 can be mounted to the auxiliary housing 82 adjacent to the auxiliary evaporator 36. The heater 90 could be any number of systems capable of heating the refrigerant in the auxiliary evaporator 36 and converting the liquid refrigerant to the vapor refrigerant. For example, the heater 90 may be a heating element such as a resistance surface heater that is electrically operative to heat the auxiliary evaporator 36 and the refrigerant inside. It will be appreciated by those skilled in the art that the heater 90 could also be a type of heat exchanger using other heat sources such as engine coolant. The heater 90 may also be a heater core, oil cooler, PTC heater or any electronically, chemically, mechanically operative heaters, and the like. The heater 90 may extend across and/or cover the auxiliary evaporator 36, or alternatively, the heater 90 may extend across only a portion of the auxiliary evaporator 36. The heater 90 may also be mounted to a side of the auxiliary evaporator 36, as shown by the broken lines in FIG. 2.

Preferably, the heater 90 is insulated from the air within the auxiliary HVAC unit 30 by an insulator 98. The insulator can cover one side of the heater 90 opposite the auxiliary evaporator 36 such that the heat from the heater 90 is directed toward the auxiliary evaporator 36. The insulator 98 may be comprised of a number of different insulating materials including, but not limited to fiberglass pulp, glass or porcelain, ceramic, ebonite, paraffin, rubber or plastic, metal wrapping, and the like. The insulator 98 and the heater 90 should be resistant to corrosion resulting from exposure to the conditions within the auxiliary HVAC unit 30.

The dual evaporator air conditioning system 20 includes a control system 116 having cooling and non-cooling modes 118,119,120,121 for each of the HVAC units 28,30 to control the dual evaporator air conditioning system 20. Preferably, the control system 116 includes a controller 124 centralized within the control system 116 to control the dual evaporator air conditioning system 20. The controller 124 utilizes input signals and control signals, as is well known in the art, to control the dual evaporator air conditioning system 20. It will be appreciated that the controller 124 is powered by a power source in the vehicle 16 such as a battery, power cell, power generator, or the like. A control panel (not shown) that is operatively connected to the controller 124 and accessible to a user of the vehicle 16 is used to control several features of the control system 116.

Preferably, the user controls whether the primary and auxiliary HVAC units 28,30 are placed in the cooling mode 118,119 or the non-cooling mode 120,121. The user selects the cooling or non-cooling mode 118,119,120,121 for each of the HVAC units 28,30 based on whether the user wishes to provide cooled air to the front and/or rear portions 10,12 of the cabin 14. Preferably buttons on the control panel, schematically represented in FIG. 3, are used to request the cooled air for the front and rear portions 10,12 of the cabin 14. Although FIG. 3 illustrates separate buttons for the cooling and non-cooling modes 118,119,120,121, it is preferable to utilize a single button for each of the primary and auxiliary HVAC units 28,30. In this manner, each air conditioning unit is placed in the cooling mode 118,119 when the user activates the corresponding button. Conversely, each air conditioning unit is placed in the non-cooling mode 120,121 when the user deactivates the corresponding button. Pressing the buttons sends input signals to the controller 124 to indicate the user's desired cooling conditions. The controller 124 then uses those input signals to control other aspects of the control system 116 as will be described further below.

The user also controls temperature settings for the front and rear portions 10,12 of the cabin 14 and primary and auxiliary blower speeds to temperately control the air in the front and rear portions 10,12. It should be appreciated by those skilled in the art that user control of the primary and auxiliary HVAC units 28,30 could be accomplished in several ways. Therefore, the specific manner in which the user controls the primary and auxiliary HVAC units 28,30 is not intended to limit the present invention.

Many features of the control system 116 are controlled automatically, i.e., control signals are automatically sent from the controller 124 in response to the input signals sent to the controller 124. For instance, the compressor 38 is automatically activated when the user has selected the cooling mode 118 for the primary HVAC unit 28. The compressor 38 then begins to automatically circulate refrigerant through the refrigerant cycle.

In the preferred embodiment, the control system 116 automatically activates the heater 90 in response to the auxiliary HVAC unit 30 being in the non-cooling mode 121 while the primary HVAC unit 28 is in the cooling mode 118. When the user has selected the cooling mode 118 for the primary HVAC unit 28, a control signal is sent from the controller 124 to the compressor 38 and the compressor 38 is activated. The compressor 38 then begins to circulate refrigerant through the refrigerant cycle. This includes circulating refrigerant through both the primary and auxiliary evaporators 32,36 even though the user has selected the non-cooling mode 121 for the auxiliary HVAC unit 30. The primary blower 52 moves air across the primary evaporator 32 to transfer heat from the air to the refrigerant in the primary HVAC unit 28. However, since the user has selected the non-cooling mode 121 for the auxiliary HVAC unit 30, air is not moved across the auxiliary evaporator 36 to be cooled, i.e., the user has selected not to cool the rear portion 12 of the cabin 14. As a result, heat from the air is not transferred to the refrigerant. Therefore, the heater 90 is automatically activated to heat the refrigerant and prevent accumulation of liquid refrigerant and lubricating oil in the auxiliary evaporator 36, as previously described. Preferably, an electrical output signal is sent from the controller 124 to the heater 90 to activate the heater 90.

A temperature sensor 94 such as a thermocouple may be positioned near the heater 90 to determine the temperature of the heater 90. The temperature sensor 94 is operatively connected to the controller 124 to relay the temperature of the heater 90 back to the controller 124. The controller 124 controls the temperature of the heater 90 when the auxiliary HVAC unit 30 is in the non-cooling mode 121 while the primary HVAC unit 28 is in the cooling mode by adjusting the electrical control signal sent from the controller 124 to the heater 92. The temperature of the heater 90 varies as a magnitude of the control signal varies. The controller 124 may be programmed to adjust the temperature of the heater 90 based on a predetermined condition such as an average temperature in the auxiliary housing 82 or to maintain a steady optimum temperature for converting liquid refrigerant to vapor or gas refrigerant.

The control system 116 includes a sensor 128 that is operatively connected to the controller 124. The controller 124 is responsive to the sensor 128 to sense when the auxiliary HVAC unit 30 is in the non-cooling mode 121 while the primary HVAC unit 28 is in the cooling mode 118. Preferably, the sensor 128 represents computer code within the controller 124 that recognizes the input signals triggered by the user to determine when the auxiliary HVAC unit 30 is in the non-cooling mode 121 while the primary HVAC unit 28 is in the cooling mode 118.

The control system 116 includes an auxiliary blower controller 132 that is operatively connected to the controller 124. The auxiliary blower controller 132 actuates a motor 133 to rotate the auxiliary blower 84 when the auxiliary HVAC unit 30 is in the cooling mode 119. The auxiliary blower controller 132 is responsive to the controller 124 to operate the auxiliary blower 84 via the motor 133 at a user selected blower speed when the auxiliary HVAC unit 30 is in the cooling mode 119. The auxiliary blower controller 132 deactivates the auxiliary blower 84 when the auxiliary HVAC unit 30 is in the non-cooling mode 121 while the primary HVAC unit is in the cooling mode 118. In this manner, there is no air flow to the rear portion 12 of the cabin 14. It should be appreciated that the auxiliary blower controller 132 may be a separate component from the controller 124, or the auxiliary blower controller 132 may represent computer code within the controller 124. In other words, the controller 124 may be adapted to include the auxiliary blower controller 132.

The control system 116 includes a primary blower controller 135 that is operatively connected to the controller 124. The primary blower controller 135 actuates a motor 137 to rotate the primary blower 52. The primary blower controller 135 is responsive to the controller 124 to operate the primary blower 52 when the primary HVAC unit 28 is in the cooling mode 118. The primary blower 52 moves the cooled air into the front portion 10 of the cabin 14 when the primary HVAC unit 28 is in the cooling mode 118.

The control system 116 includes an auxiliary actuator 130 that is operatively connected to the controller 124. The auxiliary actuator 130 is responsive to the controller 124 to move or pivot the auxiliary mode door 86 between the first and second positions 87,88. The control system 116 includes a first actuator 134 that is operatively connected to the controller 124. The first actuator 134 is responsive to the controller 124 to move the first mode door 64 between the first and second positions 66,68. The control system 116 also includes a second actuator 136 that is operatively connected to the controller 124. The second actuator 136 is responsive to the controller 124 to move the second mode door 70 between the first and second positions 72,74. The control system 116 also includes a third actuator 139 operatively connected to the controller 124 to move the intake door 56 between the positions 57,59 corresponding to drawing in the outside air and drawing in the air from the front portion 10.

The primary and auxiliary HVAC units 28,30 may include primary and auxiliary heater cores 142,144 in addition to the primary and auxiliary evaporators 32,36. It should be appreciated by those skilled in the art that the present invention may provide primary and auxiliary air conditioning units 138,140 having the evaporators 32,36 without the heater cores 142,144. For clarity, the above description is directed toward the HVAC units 28,30. However, the primary and auxiliary air conditioning units 138,140 may be used interchangeably for the HVAC units 28,30 while still accomplishing the present invention. In this instance, the primary and auxiliary air conditioning units 138,140 include all of the features and perform all of the functions of the primary and auxiliary HVAC units 28,30. In other words, the heater cores 142,144 are not necessary to carry out the present invention.

The heater cores 142,144 are positioned in first and second coolant loops 146,148. The first and second coolant loops 146,148 are interconnected and circulate coolant from an engine 152 through the heater cores 142,144. A water pump 150 is used to circulate the coolant through the engine 152 of the vehicle 16 and into the first and second coolant loops 146,148, as is well known in the art.

The heater cores 142,144 are disposed within the primary and auxiliary housings 50,82 downstream of the primary and auxiliary evaporators 32,36. The heater cores 142,144 are separated from the evaporators 32,36 by primary and auxiliary air mixing doors 154,156. The air mixing doors 154,156 include actuators 158,160 that are controlled by the controller 124 to move the air mixing doors 154,156. Movement of the air mixing doors 154,156 is based on user-selected parameters such as temperature to control the temperature of the air entering the front and rear portions 10,12 of the cabin 14. The primary and auxiliary blowers 52,84 move the air from the front and rear portions 10,12, or alternatively, the primary blower 52 moves the outside air across the primary and auxiliary evaporators 32,36 and primary and auxiliary heater cores 142,144, depending on the positioning of the air mixing doors 154,156. The use and control of air mixing doors 154,156 to control air temperature are well known in the art and therefore, will not be described in detail.

An example of a method of cooling the air in the front and rear portions 10,12 of the cabin 14 of the vehicle 16 will now be described. It should be appreciated that the following example represents one of many ways in which the method of the present invention may be carried out.

To start, the method includes switching each of the primary and auxiliary HVAC units 28,30 from the non-cooling mode 120,121 to the cooling mode 118,119. The compressor 38 is activated in response to the primary HVAC unit 28 being switched from the non-cooling mode 120 to the cooling mode 118. The compressor 38 then begins to circulate the refrigerant through the primary HVAC unit 28 and the auxiliary HVAC unit 30 in response to activating the compressor 38. The primary blower 52 is also activated to move the air across the primary evaporator 32 and transfer the heat from the air to the refrigerant to cool the air for the front portion 10 of the cabin 14 in response to the primary HVAC unit 28 being in the cooling mode 118. The primary HVAC unit 28 then discharges the cooled air into the front portion 10 of the cabin 14 in response to activating the primary blower 52. Specifically, the primary blower 52 moves air across the primary evaporator 32 to be cooled, then discharges the air through one of the plurality of primary air ducts 62 as selected by the user.

The auxiliary blower 84 is activated to move the air across the auxiliary evaporator 36 and transfer the heat from the air to the refrigerant to cool the air in the rear portion 12 of the cabin 14 in response to the auxiliary HVAC unit 30 being in the cooling mode 119. The cooled air is transferred into the rear portion 12 of the cabin 14 in response to activating the auxiliary blower 84. The user then switches the auxiliary HVAC unit 30 from the cooling mode 119 to the non-cooling mode 121 while the primary HVAC unit 28 remains in the cooling mode 118. The auxiliary blower 84 is then shut down, i.e., power is discontinued to the motor 133 by the controller 124 and the cooled air is not discharged into the rear portion 12. Simultaneously, the heater is automatically activated by the control system 116, i.e., the controller 124 transmits the electrical output signal to the heater to begin raising the temperature of the heater. Again, this is in response to the auxiliary HVAC unit 30 being switched from the cooling mode 119 to the non-cooling mode 121 while the primary HVAC unit 28 remains in the cooling mode 118.

The above described method is associated with an instance in which the user has requested cooled air for both the front and rear portions 10,12 of the cabin 14, but then decides to stop cooling the rear portion 12, i.e., by switching the auxiliary HVAC unit 30 to the non-cooling mode 121.

In an alternative method, only the primary HVAC unit 28 is switched to the cooling mode 118 while the auxiliary HVAC unit 30 remains in the non-cooling mode 121. In this instance, the method continues as described above, i.e., the compressor 38 is activated, the primary blower 52 is activated, the auxiliary blower 84 is deactivated, and the heater 90 is automatically activated. This alternative method can be associated with an instance in which the user has recently entered the vehicle 16 and only requests cooled air for the front portion 10, i.e., by switching only the primary HVAC unit 28 to the cooling mode 118.

It should be appreciated by those skilled in the air conditioning and refrigeration arts that the dual evaporator air conditioning system 20 of the present invention may be employed in non-automotive applications. For example, refrigeration systems such as food display cases, and residential air conditioning systems (mini-split, wall mounted room air conditioning units) may interconnect multiple evaporators with a common compressor. Therefore, the dual evaporator air conditioning system 20 of the present invention may be utilized as such.

Obviously, many modifications and variations of the present invention are possible in light of the above teachings. The invention may be practiced otherwise than as specifically described within the scope of the appended claims.

What is claimed is:

1. A dual evaporator air conditioning system for use with a refrigerant for cooling air, said system comprising:
   a compressor for compressing and circulating the refrigerant;
   a primary air conditioning unit operable between cooling and non-cooling modes having a primary evaporator in fluid communication with said compressor for transferring heat from the air to the refrigerant to cool the air when in said cooling mode;

an auxiliary air conditioning unit operable between cooling and non-cooling modes having an auxiliary evaporator m fluid communication with said compressor for transferring heat from the air to the refrigerant to cool the air when in said cooling mode; and a heater proximate said auxiliary evaporator and further including means for automatically heating the refrigerant in said auxiliary when said auxiliary air conditioning unit is in said non-cooling mode while said primary air conditioning unit is in said cooling mode to prevent accumulation of the refrigerant in said auxiliary evaporator.

2. A system as set forth in claim 1 wherein said heater is mounted to said auxiliary evaporator.

3. A system as set forth in claim 2 wherein said heater is disposed in said auxiliary air conditioning unit.

4. A system as set forth in claim 1 wherein said heater is further defined as a heating element that is electrically operative for heating the refrigerant.

5. A system as set forth in claim 1 further including an insulator surrounding said heater for insulating said heater from the air within said auxiliary air conditioning unit and for reflecting heat from said heater toward said auxiliary evaporator.

6. A system as set forth in claim 1 further including a control system having said cooling and non-cooling modes for each of said air conditioning units for automatically activating said heater in response to said auxiliary air conditioning unit being in said non-cooling mode while said primary air conditioning unit is in said cooling mode.

7. A system as set forth in claim 6 wherein said control system includes a sensor for sensing when said auxiliary air conditioning unit is in said non-cooling mode while said primary air conditioning unit is in said cooling mode.

8. A system as set forth in claim 7 further including an auxiliary housing surrounding said auxiliary evaporator.

9. A system as set forth in claim 8 further including an auxiliary blower engaging said auxiliary housing for moving the air across said auxiliary evaporator to transfer heat from the air to the refrigerant.

10. A system as set forth in claim 9 further including an auxiliary mode door engaging said auxiliary housing and movable between a first position and a second position.

11. A system as set forth in claim 10 wherein said control system includes an auxiliary actuator for moving said auxiliary mode door from said first position to said second position.

12. A system as set forth in claim 11 further including a plurality of auxiliary air duct housings extending from and engaging said auxiliary housing to define an auxiliary vent duct and an auxiliary floor duct for distributing the air from said auxiliary air conditioning unit wherein said auxiliary mode door directs the air to said auxiliary vent duct in said first position and to said auxiliary floor duct in said second position.

13. A system as set forth in claim 12 further including an air intake vent near said auxiliary housing for guiding the air into said auxiliary housing.

14. A system as set forth in claim 13 further including a primary housing surrounding said primary evaporator.

15. A system as set forth in claim 14 further including a primary blower engaging said primary housing for moving the air across said primary evaporator for transferring heat from the air to the refrigerant.

16. A system as set forth in claim 15 further including a plurality of primary air duct housings extending from and engaging said primary housing to define a plurality of primary air ducts for distributing the air from said primary air conditioning unit.

17. A system as set forth in claim 16 further including a first mode door engaging said housing and movable between first and second positions for selectively distributing the air from said primary air conditioning unit into said primary air ducts.

18. A system as set forth in claim 17 wherein said control system includes a first actuator for moving said first mode door between said first and second positions.

19. A system as set forth in claim 18 further including a second mode door engaging said housing and movable between first and second positions for selectively distributing the air from said primary air conditioning unit into said primary air ducts.

20. A system as set forth in claim 19 wherein said control system includes a second actuator for moving said second mode door between said first and second positions.

21. A system as set forth in claim 20 wherein said plurality of primary air ducts include a primary defrost duct, a primary vent duct, and a primary floor duct.

22. A method of cooling air comprising the steps of:
conditioning front and rear portions of a cabin of a vehicle using a dual evaporator air conditioning system having a heater and primary and auxiliary air conditioning units operable between cooling and non-cooling modes, sensing when the auxiliary air conditioning unit is in the non-cooling mode while the primary unit is in the cooling mode; and automatically activating a heater located proximate to an auxiliary evaporator of said auxiliary air conditioning unit to heat the refrigerant in said auxiliary evaporator in response to sensing the auxiliary air conditioning unit is in the cooling mode to prevent the accumulation of refrigerant in said auxiliary evaporator.

23. A method of cooling air in front and rear portions of a cabin of a vehicle using a dual evaporator air conditioning system having primary and auxiliary air conditioning units, a control system for controlling the air conditioning units between cooling and non-cooling modes, and a compressor for circulating refrigerant through the air conditioning units, said method comprising the steps of:

switching each of the primary and auxiliary air conditioning units from the non-cooling mode to the cooling mode;

activating the compressor in response to the primary air conditioning unit being switched from the non-cooling mode to the cooling mode;

circulating refrigerant through the primary air conditioning unit and the auxiliary air conditioning unit in response to activating the compressor;

activating a primary blower for transferring heat from the air to the refrigerant to cool the air in the front portion of the cabin in response to the primary air conditioning unit being in the cooling mode;

discharging cooled air into the front portion of the cabin in response to activating the primary blower;

activating an auxiliary blower for transferring heat from the air to the refrigerant to cool the air in the rear portion of the cabin in response to the auxiliary air conditioning unit being in the cooling mode;

discharging cooled air into the rear portion of the cabin in response to activating the auxiliary blower;

switching the auxiliary air conditioning unit from the cooling mode to the non-cooling mode while the primary air conditioning unit remains in the cooling mode; and automatically activating a heater near the auxiliary air conditioning unit to heating refrigerant in an auxiliary evaporator in response to the auxiliary air conditioning unit being switched from the cooling mode to the non-cooling mode while the primary air conditioning unit remains in the cooling mode.

24. A method as set forth in claim 23 wherein the step of automatically activating the heater further includes the step of transmitting an electrical signal from the control system to a heating element.

25. A method as set forth in claim 24 further including the step of evaporating the refrigerant in an auxiliary evaporator of the auxiliary air conditioning unit using the heating element and in response to activating the heating element.

26. A method as set forth in claim 25 further including the step of sensing when the auxiliary air conditioning unit is switched from the cooling mode to the non-cooling mode while the primary air conditioning unit is in the cooling mode.

* * * * *